(12) United States Patent
Blouin et al.

(10) Patent No.: US 11,543,007 B2
(45) Date of Patent: Jan. 3, 2023

(54) SKEW LIMITER FOR A TORIC-DRIVE CVT

(71) Applicant: TRANSMISSION CVTCORP INC., Sainte-Julie (CA)

(72) Inventors: Alexandre Blouin, Beloeil (CA); Maxime Desjarlais, Mont-Saint-Hilaire (CA)

(73) Assignee: TRANSMISSION CVTCORP INC.

( * ) Notice: Subject to any disclaimer, the term of this patent is extended or adjusted under 35 U.S.C. 154(b) by 185 days.

(21) Appl. No.: 16/612,179

(22) PCT Filed: May 9, 2018

(86) PCT No.: PCT/CA2018/050553
§ 371 (c)(1),
(2) Date: Nov. 8, 2019

(87) PCT Pub. No.: WO2018/205027
PCT Pub. Date: Nov. 15, 2018

(65) Prior Publication Data
US 2021/0062894 A1  Mar. 4, 2021

Related U.S. Application Data

(60) Provisional application No. 62/504,592, filed on May 11, 2017.

(51) Int. Cl.
*F16H 15/38* (2006.01)
*F16H 37/08* (2006.01)
*F16H 61/664* (2006.01)

(52) U.S. Cl.
CPC ............ *F16H 15/38* (2013.01); *F16H 37/086* (2013.01); *F16H 61/6649* (2013.01); *F16H 2015/383* (2013.01)

(58) Field of Classification Search
CPC ........................... F16H 15/38; F16H 2015/383
USPC ...................................................... 476/40, 42
See application file for complete search history.

(56) References Cited

U.S. PATENT DOCUMENTS

| 2,856,784 | A | * | 10/1958 | Weisel | ............... F16H 15/38 476/44 |
| 3,159,042 | A | * | 12/1964 | Kraus | ............... F16H 15/38 476/10 |
| 4,159,653 | A | | 7/1979 | Koivunen | |
| 2014/0334958 | A1 | | 11/2014 | Messier | |

FOREIGN PATENT DOCUMENTS

| GB | 1069874 | 5/1967 |
| GB | 2150240 | 6/1985 |
| JP | 2010-190382 | 9/2010 |
| WO | 2013155602 | 10/2013 |

OTHER PUBLICATIONS

PCT International Search Report for PCT International Patent Application No. PCT/CA2018/050553; dated Aug. 2, 2018; (3 pages).
Extended European Search Report for European Patent Application No. 18798226.9; dated Oct. 16, 2020; (8 pages).

* cited by examiner

*Primary Examiner* — William C Joyce
(74) *Attorney, Agent, or Firm* — K&L Gates LLP

(57) ABSTRACT

In part, skew limiter for a toric-drive CVT embodiments are disclosed. A skew limiter may include a shaped piece that limits the skew angle to a known angle notwithstanding the tilt angle of the rollers.

21 Claims, 9 Drawing Sheets

US 11,543,007 B2

SKEW LIMITER FOR A TORIC-DRIVE CVT

CROSS-REFERENCE TO RELATED APPLICATIONS

This is the national phase under 35 U.S.C. § 371 of International Application No. PCT/CA2018/050553, filed on May 9, 2018, which claims priority to and the benefit of U.S. Provisional Application No. 62/504,592, filed on May 11, 2017, the disclosures of which are herein incorporated by reference in their entirety.

FIELD

The present invention generally relates to Toric-drive Continuously Variable Transmissions (CVT). More specifically, the present invention is concerned with a skew limiter for a Toric-drive CVT.

BACKGROUND

Toric-drive Continuously Variable Transmissions (hereinafter generically referred to as "CVT") are believed known in the art. The operation of such a CVT will therefore only be briefly discussed herein.

Generally stated, a CVT is provided with a drive disk having a toroidal surface, a driven disk also having a toroidal surface facing the toroidal surface of the drive disk, both disks being linked by rollers in contact with their respective toroidal surfaces. The tilt angle of the rollers with respect to the drive and driven disks dictates the speed ratio between the driven and drive disks since this angle dictates the radial positions at which the rollers contact the two toroidal surfaces.

These rollers are generally linked to one another so that their tilt angle about a tilt axis is the same. A roller position control mechanism is therefore provided to insure that the rollers are constantly at the same tilt angle and move simultaneously when they change from one ratio to another, i.e. from one tilt angle to another.

Conventional roller position control mechanism rely on a small movement about a skew axis, i.e. an axis perpendicular to the tilt axis, to initiate the movement of the rollers about the tilt axis that changes them from one tilt angle to another.

DETAILED DESCRIPTION

Figure 1:
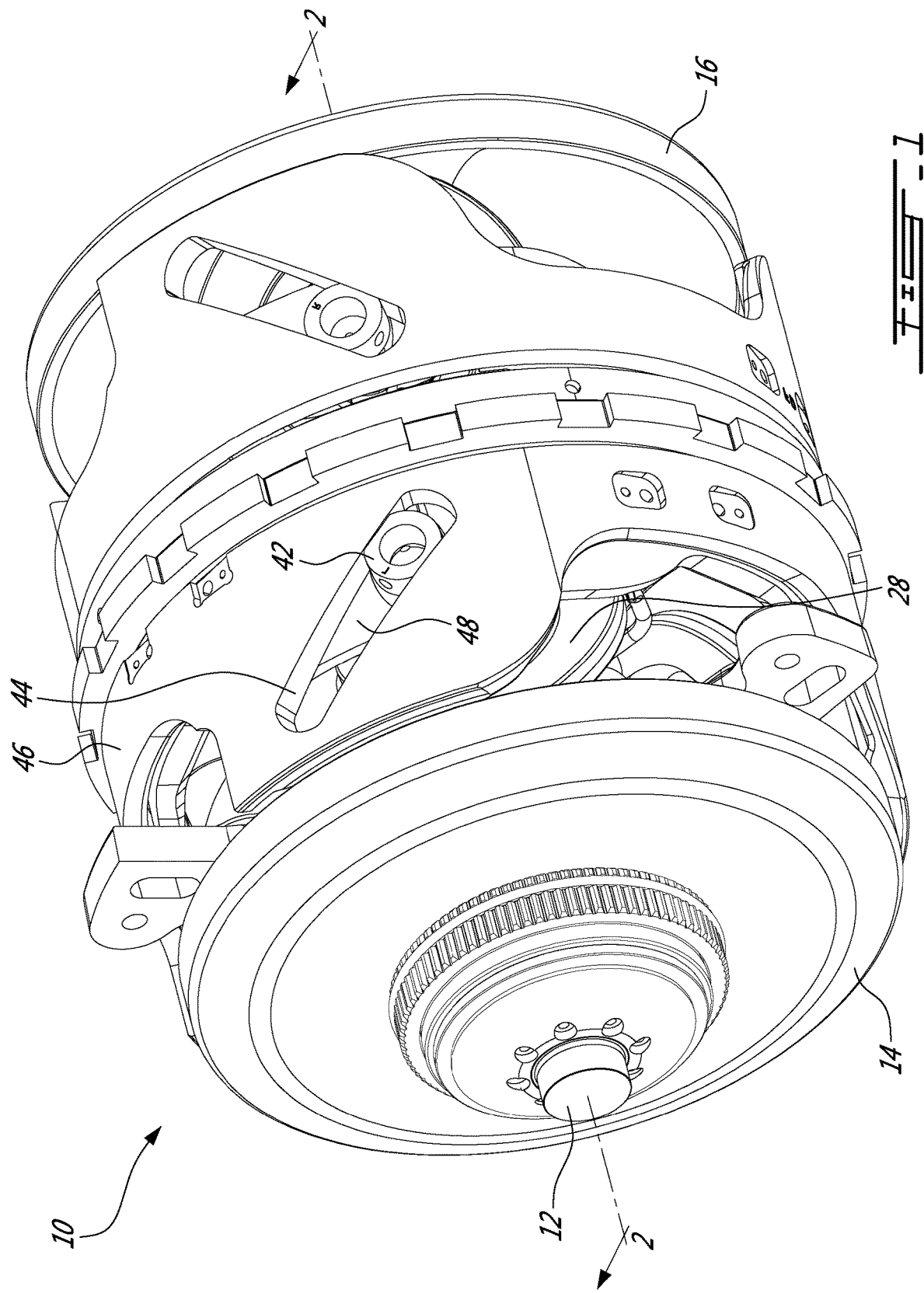
FIG. 1 is a perspective view of a dual-cavity toric-drive CVT.

An object is generally to provide a skew limiter for a toric-drive CVT.

According to an illustrative embodiment, there is provided a toric-drive continually variable transmission comprising:

a longitudinal shaft lying in a longitudinal axis and supporting an input disk thereon and an output disk via a non-rotating sleeve; the input and output disks having facing toroidal surfaces;

at least two rollers interconnecting the toroidal surfaces of the input and output disks; each of the at least two rollers having an axle provided with a distal end; each at least two rollers being so mounted to the non-rotating sleeve as to be movable along a skew axis and a tilt axis;

a control ring so mounted to the transmission as to be pivotable about the longitudinal axis, the control ring including apertures each receiving the distal end of the roller axle of one of the at least two rollers; pivotment of the control ring about the longitudinal axis causing a movement of the at least two rollers in the skew axis; and a skew limiter provided between the roller axle of one of the at least two rollers and the control ring; the skew limiter including first and second shaped projections so configured as to abut the control ring when a predetermined maximal skew angle of the roller is reached; the skew limiter thereby limiting the skew angle to a known maximal angle notwithstanding the tilt angle of the at least two rollers The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

It is to be noted that the expression "prime mover" is to be construed herein and in the appended claims as an internal combustion engine a turbine engine, or any other mechanical power production element or assembly.

It is to be noted that while the expression "CVT", standing for Continuously Variable Transmission is to be construed, herein and in the appended claims as any toric-drive continuously variable transmission including, amongst others, dual-cavity full toroidal CVT, half-toroidal CVT; single cavity toroidal CVT. It is also to be noted that the term "CVT" is also to be construed, herein and in the appended claims, as a CVT provided with further elements allowing it to operate as an IVT, standing for Infinitely Variable Transmission, a subset of CVT designs in which the range of ratios of output shaft speed to input shaft speed includes a zero ratio.

It is to be noted that the expression "overdrive" when used herein in the context of a transmission, is to be construed herein and in the appended claims as a condition where the transmission ratio is such that the transmission output speed is higher than the transmission input speed.

It is to be noted that the expression "underdrive" when used herein in the context of a transmission, is to be construed herein and in the appended claims as a condition where the transmission ratio is such that the transmission output speed is lower than the transmission input speed.

The expressions "connected" and "coupled" are interchangeable and should be construed herein and in the appended claims broadly so as to include any cooperative or passive association between mechanical parts or components. For example, such parts may be assembled together by direct coupling or connection, or indirectly coupled or connected using further parts in between. The coupling and connection can also be remote, using for example a magnetic field or else.

The expression "input", without reference to a specific component such as a shaft, should be construed herein and in the appended claims, as including any movable part of an object, an assembly, a system or a mechanism that is used to receive a mechanical work from same or from another assembly, system or mechanism. Similarly, the expression "output" should be construed as including a similar part that is used to transfer a mechanical work.

The expression "gear ratio" should be construed herein and in the appended claims broadly as meaning the ratio between the speed of rotation at the input of a machine, system or assembly to that of the output thereof.

Other objects, advantages and features of the skew limiter for a toric-drive CVT will become more apparent upon reading of the following non-restrictive description of illustrative embodiments thereof, given by way of example only with reference to the accompanying drawings.

Generally stated, an illustrative embodiment of the skew limiter proposes a shaped piece that limits the skew angle to a known angle notwithstanding the tilt angle of the rollers.

Figure 2:
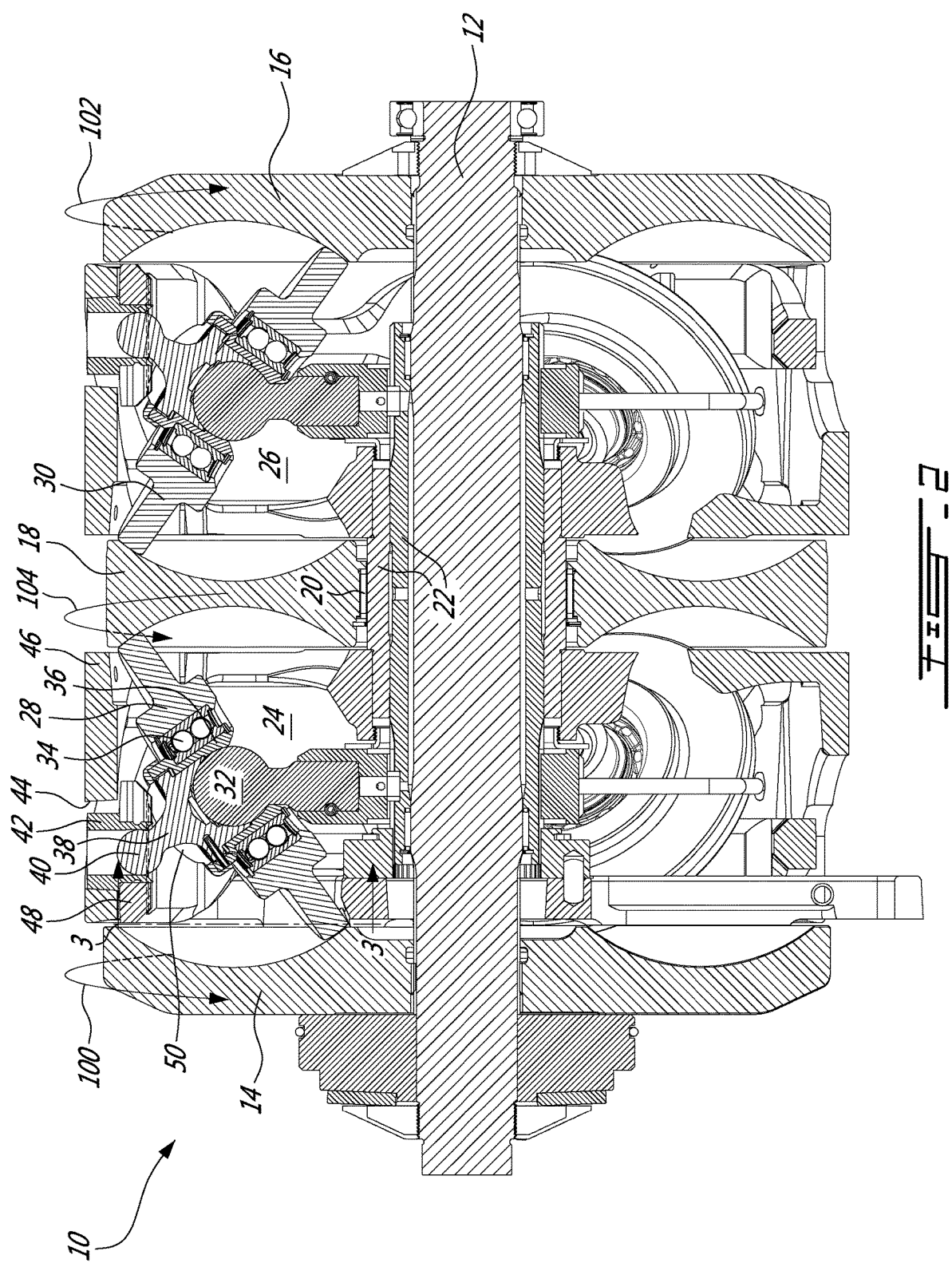
FIG. 2 is a sectional view taken along line 2-2 of FIG. 1, the CVT being shown in an underdrive position.

Turning now to FIGS. 1 and 2 of the appended drawings, a dual-cavity toric-drive CVT cartridge 10 using a skew limiter according to an illustrative embodiment will be described.

The CVT cartridge 10 includes a central shaft 12 to which first and second input disks 14 and 16 are fixedly mounted for rotation therewith. An output disk 18 is rotatably mounted to the shaft 12 via bearings 20 and a two-part non-rotating sleeve assembly 22. The disks 14, 16 and 18 include facing toroidal surfaces and define first and second cavities 24 and 26 in which rollers 28 and 30 are respectively provided. More specifically, three rollers 28 (only two shown) interconnect the first input disk 14 to the output disk 18 while three rollers 30 (only two shown) interconnect the second input disk 16 to the output disk 18.

The general operation of a toric-drive CVT where the tilt angle of the rollers determine the speed ratio between the input and output disks is believed known to those skilled in the art and will not be further described herein.

For concision purpose, only one of the rollers 28 of cavity 24 will be described hereinbelow since all the rollers 28 and 30 are similar and behave in a similar fashion.

The roller 28 is rotatably mounted to a ball end 32 via ball bearings 34 provided between the roller 28 and a roller axel hub 36 receiving the ball end 32. The ball end 32 is itself fixedly coupled to the non-rotating sleeve 22. As will be apparent to one skilled in the art, the ball end 32 allows the roller to move freely about the tilt axis (which is perpendicular to the page of FIG. 2 and passes through the middle of the ball end 32, for example) and about the skew axis (which lies at the intersection of the plane of the roller and the plane defined by the page of FIG. 2, for example). A roller axle 38 provided with a distal end defining a spherical projection 40 is mounted to the hub 36 and defines a rotation axis of the roller 28. The spherical projection 40 is received in a socket 42, itself received in an angled slot 44 of an outer control ring 46. An inner control ring 48 also receives the socket 42 in an aperture thereof (see 49 in FIG. 4).

One skilled in the art will understand that the inner control ring 48 is coaxial with the longitudinal shaft 12 and may be pivoted about the longitudinal axis defined by the longitudinal shaft to generate a skew angle since the distal end of the roller axle 38 is received in aperture 49 of the inner control ring 48. Accordingly, a change in the skew angle creates an imbalance in the roller orientation and generates a tilt angle change. Since all the rollers 28 are interconnected by the inner and outer control rings 48 and 46, they all change their skew angle, and therefore their tilt angle simultaneously.

The roller axle 38 also includes a skew limiter 50, mounted to the hub 36, to limit the skew angle that may be applied to the roller 28 by limiting the pivoting action of the inner control ring 48. Generally stated, the skew limiter 50 limits the pivoting action of the inner control ring 48 by providing shaped projections abutting against the inner control ring 48 when the maximal allowed skew angle is reached. As will be described hereinbelow, these shaped projections of the skew limiter 50 are so configured that the maximal skew angle is the same notwithstanding the tilt angle defined by the roller.

Figure 8:
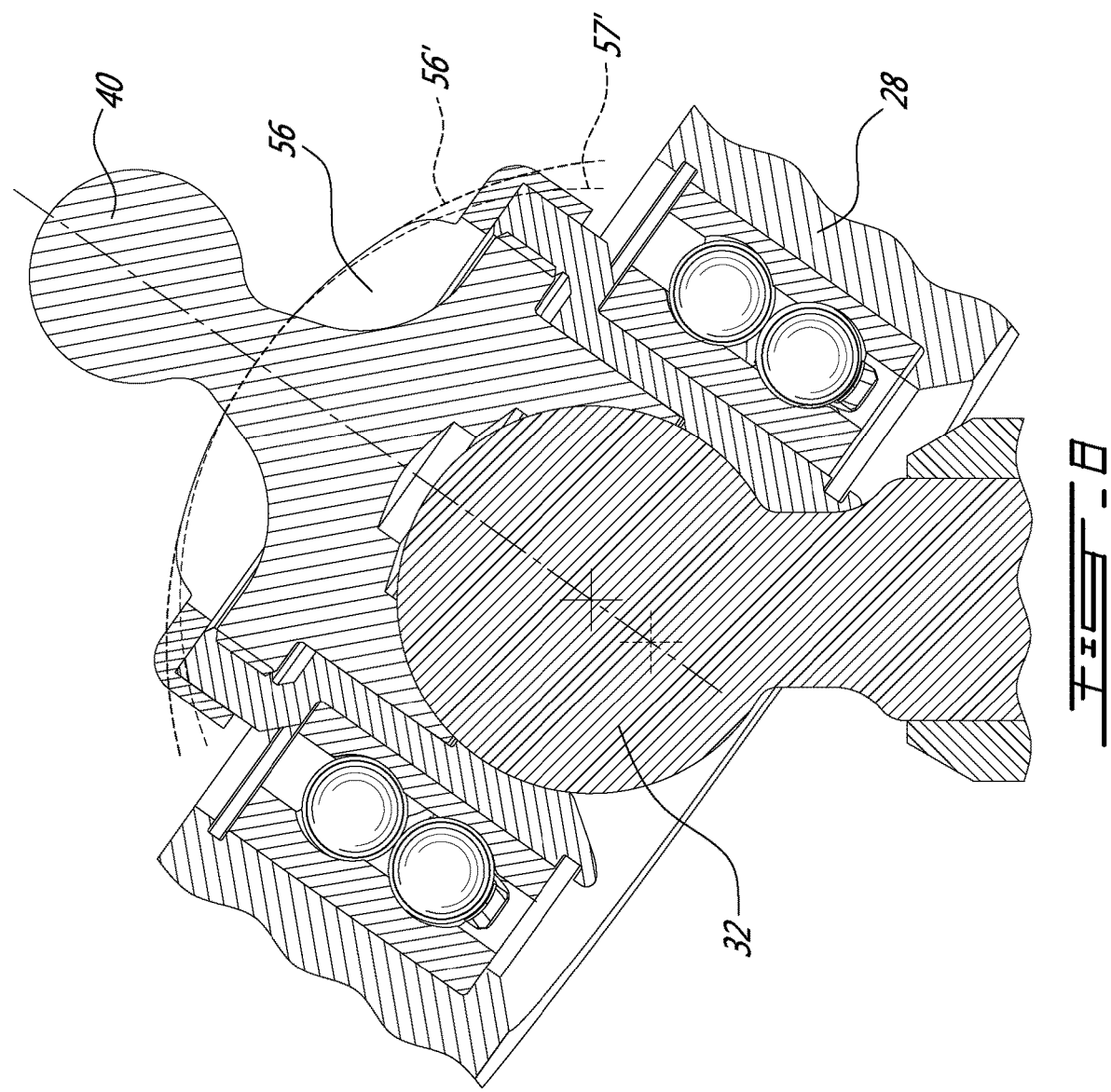
FIG. 8 is a sectional view of a portion of a roller.
Figure 9:
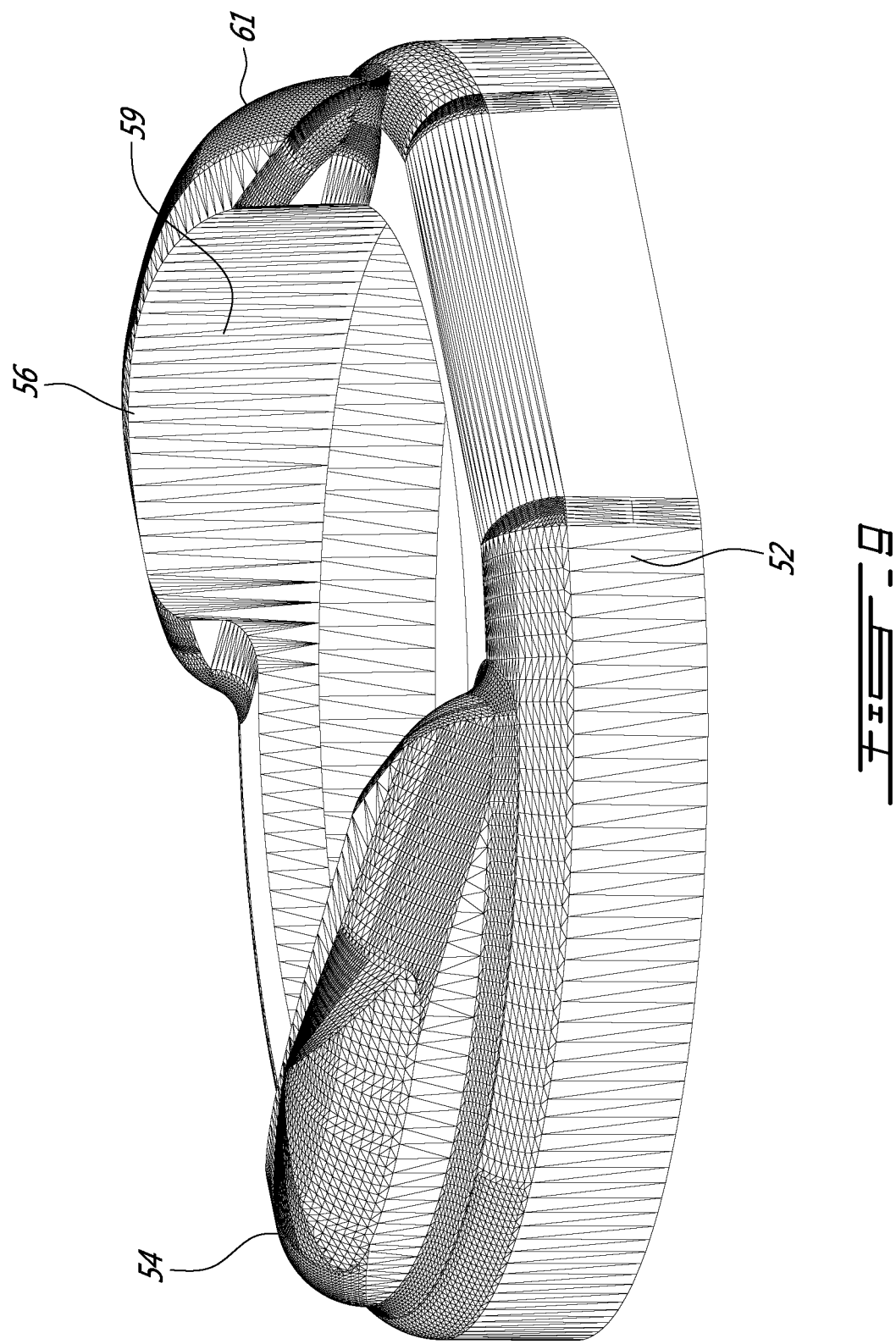
FIG. 9 is a perspective view of a skew limiter according to an illustrative embodiment.

As can be better seen from FIGS. 8 and 9, the skew limiter 50 according to an illustrative embodiment, includes a circular mounting portion 52 configured to be clipped to the hub 36 (see FIG. 2) and two shaped projections 54 and 56.

As can be netter seen from FIG. 8, the shaped projections 54 and 56 (only projection 56 shown in FIG. 8) have a semi-circular outer surface (see dashed line 56') having a greater radius than the projected radius from the center of the ball end 32 (see dashed line 57'). Indeed, since the skew limiter 50 has a generally circular shape, the radius of the semi-circular outer surface of the shaped projections is advantageously greater than the projected radius from the center of the ball end 32 so as to limit the skew angle to the same angle notwithstanding the tilt angle. One skilled in the art will understand, should the skew limiter have a generally square shape, the semi-circular outer surface could have the same radius as the projected radius.

As can be seen from FIG. 9, the shaped projections 54 and 56 have a flat and curved internal surface 59 and an irregularly curved outer surface 61.

As will be understood by one skilled in the art from the following description of the illustrated embodiment, the combination of the semi-circular outer surface 56' and the irregularly curved outer surface 61 of the shaped projections 54 and 56 is such that the maximal skew angle that the roller can reach is the same notwithstanding the tilt angle of the roller.

Figure 3:
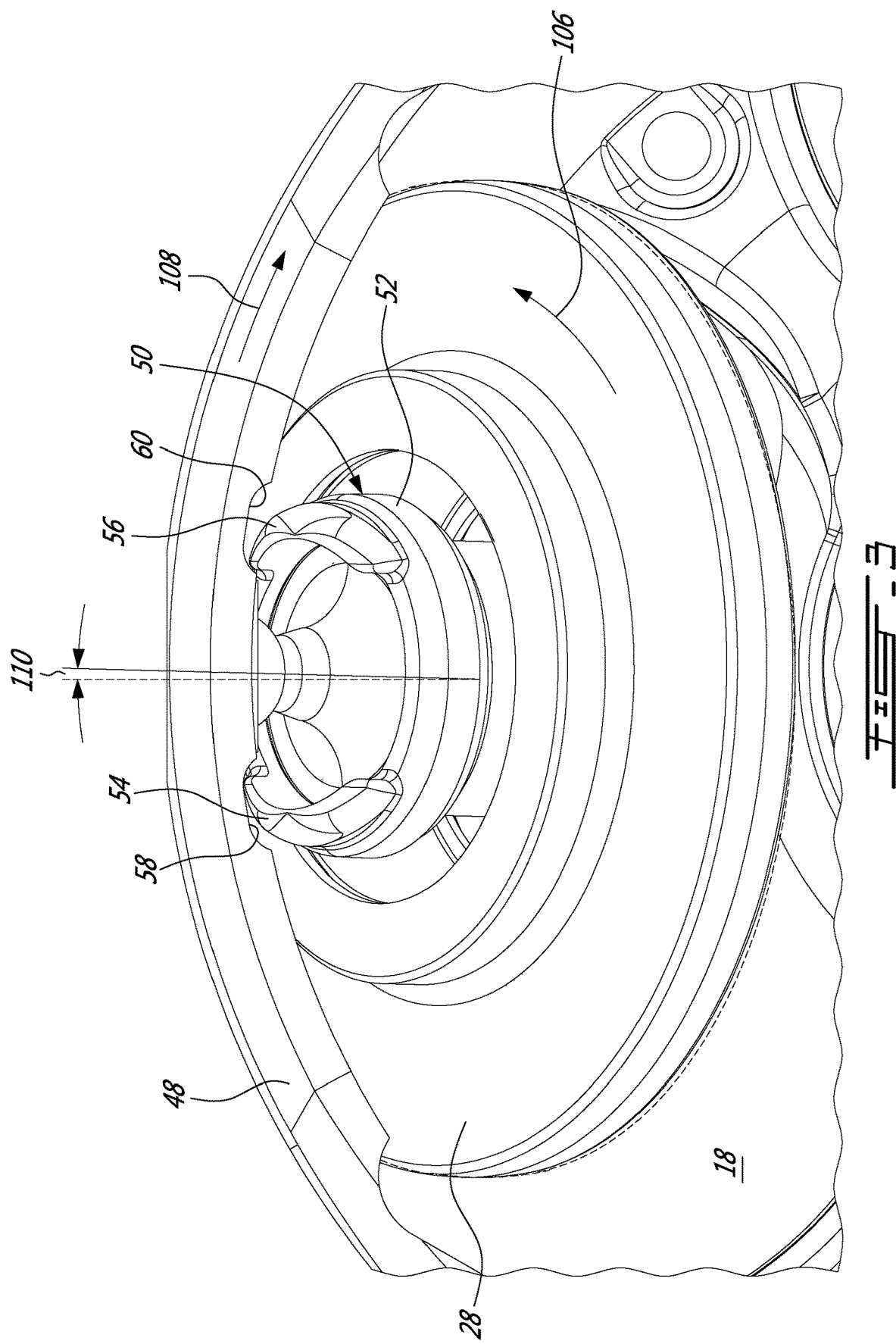
FIG. 3 is a sectional view taken along line 3-3 of FIG. 2.

Turning to FIG. 3 of the appended drawings, in the particular design of the CVT described herein the inner control ring 48 includes to cutout portions 58 and 60 so positioned as to allow a corresponding shaped projection therein.

One skilled in the art will understand that when the pivoting action of the inner control ring 48 causes one of the shaped projection 54 and 56 to contact the control ring 48 in one of the cut-out portions 58 and 60, the control ring 48 is prevented from further pivoting, which, in turn, prevents the roller 28 from skewing further, therefore limiting the skew angle of the roller 28.

As mentioned hereinabove, it is to be noted that the shaped projections 54 and 56 are so configured that the maximal skew angle that the roller 28 may take is the same notwithstanding the instantaneous tilt angle of the rollers.

One skilled in the art is believed to be in a position to determine the shape of the projections 54 and 56 so as to have an equal distance between the projection and the respective cutout portion at any tilt angle. One skilled in the art is also believed to determine the shape of the projections 54 and 56 should the inner control ring 48 be free of cutouts.

It is to be noted that the shaped projections 54 and 56 appear to have facets on the appended figures, these are for illustration purpose since it is believed that rounded projections are interesting.

The operation of the skew limiter 50 will now be described.

FIGS. 2 and 3 illustrate the CVT 10 in an underdrive position, i.e. that the output disk 18 rotates slower than the input disks 14 and 16. Arrows 100 and 102 illustrate the rotation direction of the input disks 14 and 16 while arrow 104 illustrate the rotation direction of the output disk 18. These rotation directions dictate the rotation direction of the roller 28 shown via arrow 106 in FIG. 3.

Figure 4:
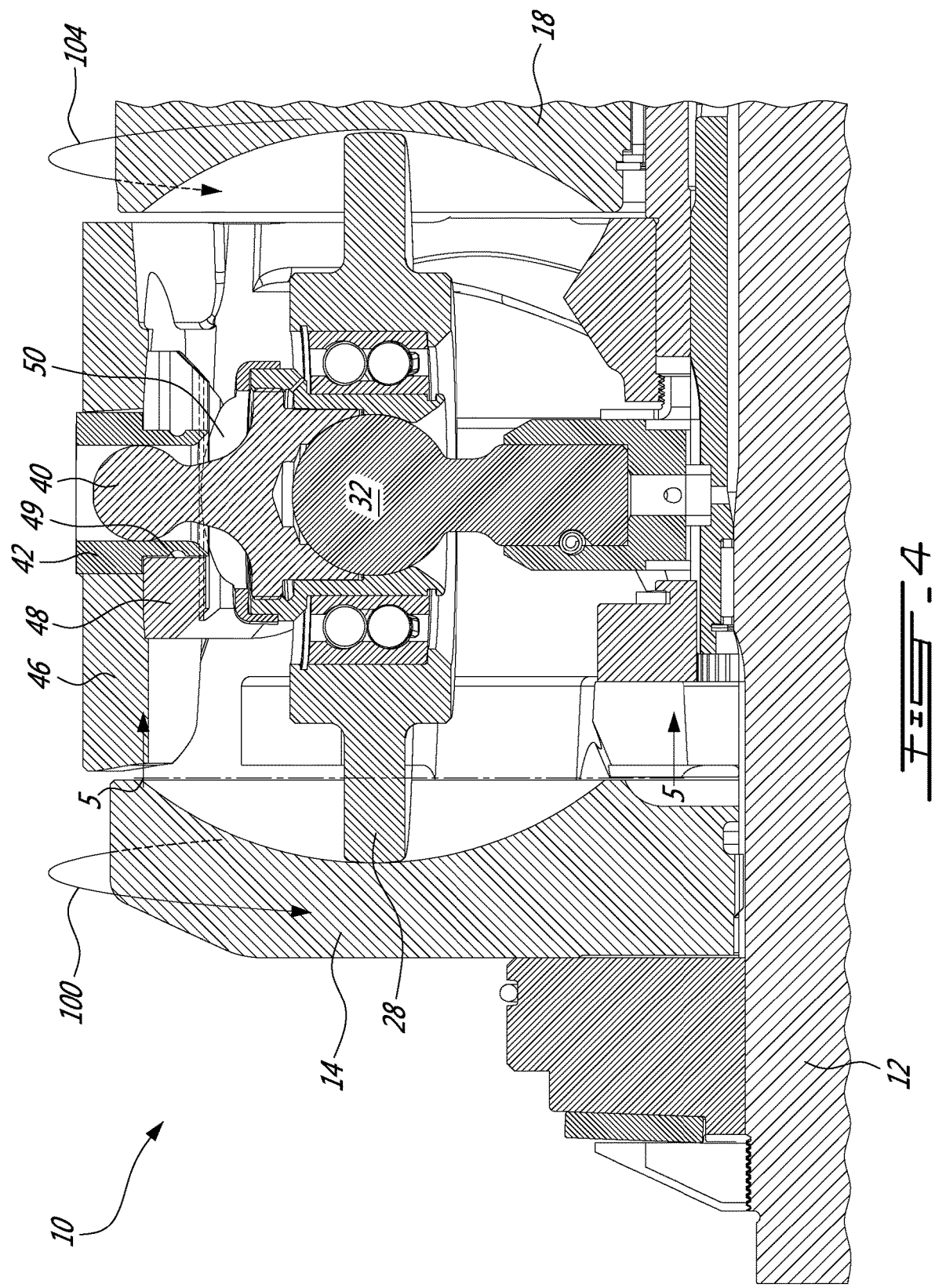
FIG. 4 is a sectional view similar to an enlarged portion of FIG. 2, the CVT being shown in a unitary position.
Figure 5:
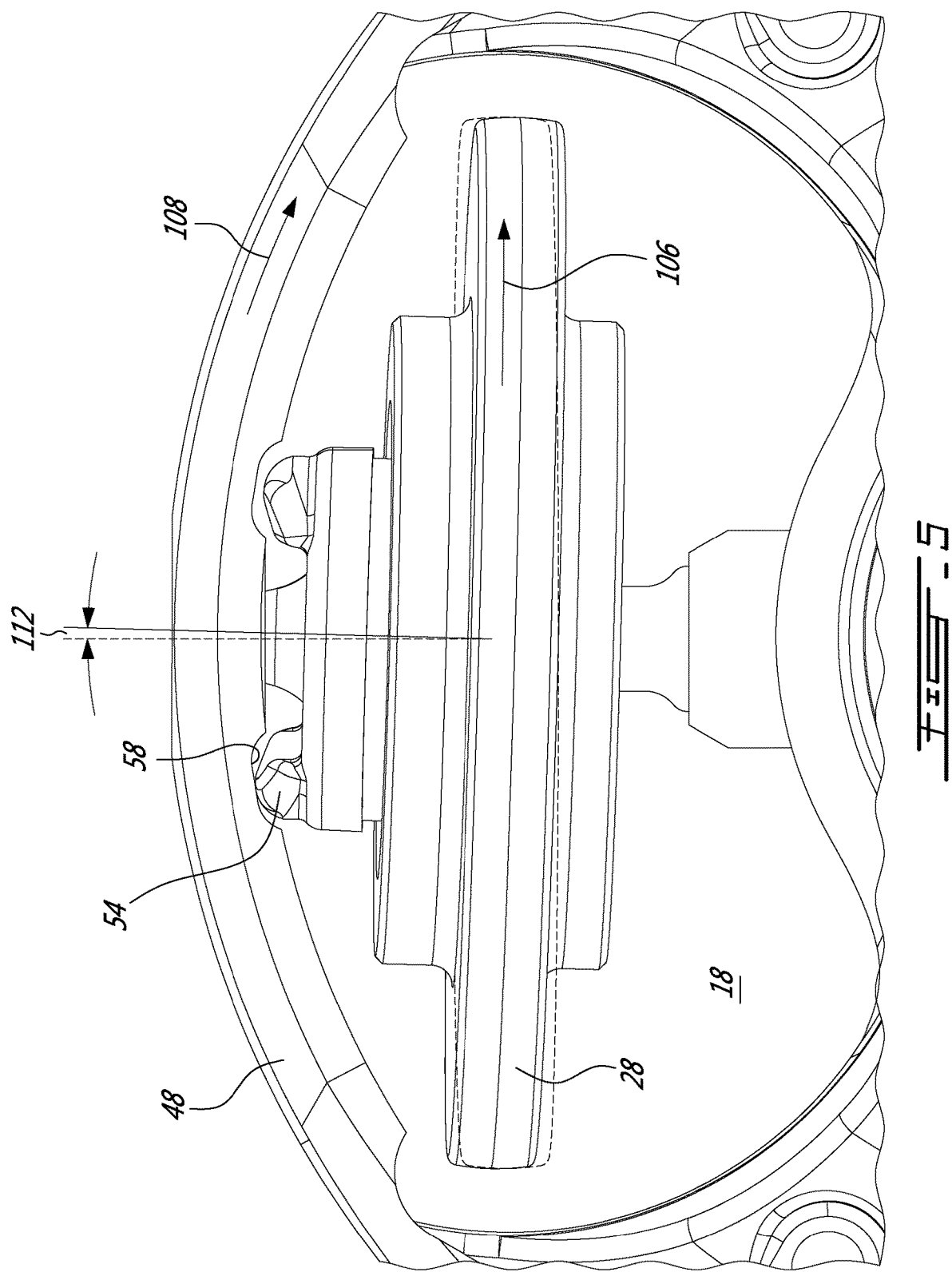
FIG. 5 is a sectional view taken along line 5-5 of FIG. 4.

To go from the underdrive position illustrated in FIGS. 2 and 3 towards the unitary position shown in FIGS. 4 and 5, the inner control ring 48 is pivoted in the direction shown by arrow 108.

In FIG. 3, the roller 28 is shown in its neutral position in dashed lines and in its maximal skew position, caused by the pivoting action of the inner control ring 48, in full lines. The rotation axis of the roller 28 is also shown in dashed and full lines to illustrate the maximal skew angle 110 of about 2 degrees that is reached when the projection 54 abuts the inner control ring 48 in its cut-out portion 58.

Turning now to FIGS. 4 and 5, that illustrates the CVT 10 in a unitary position, i.e. a position where the rotation speeds of the input and output disks are substantially equal.

Figure 6:
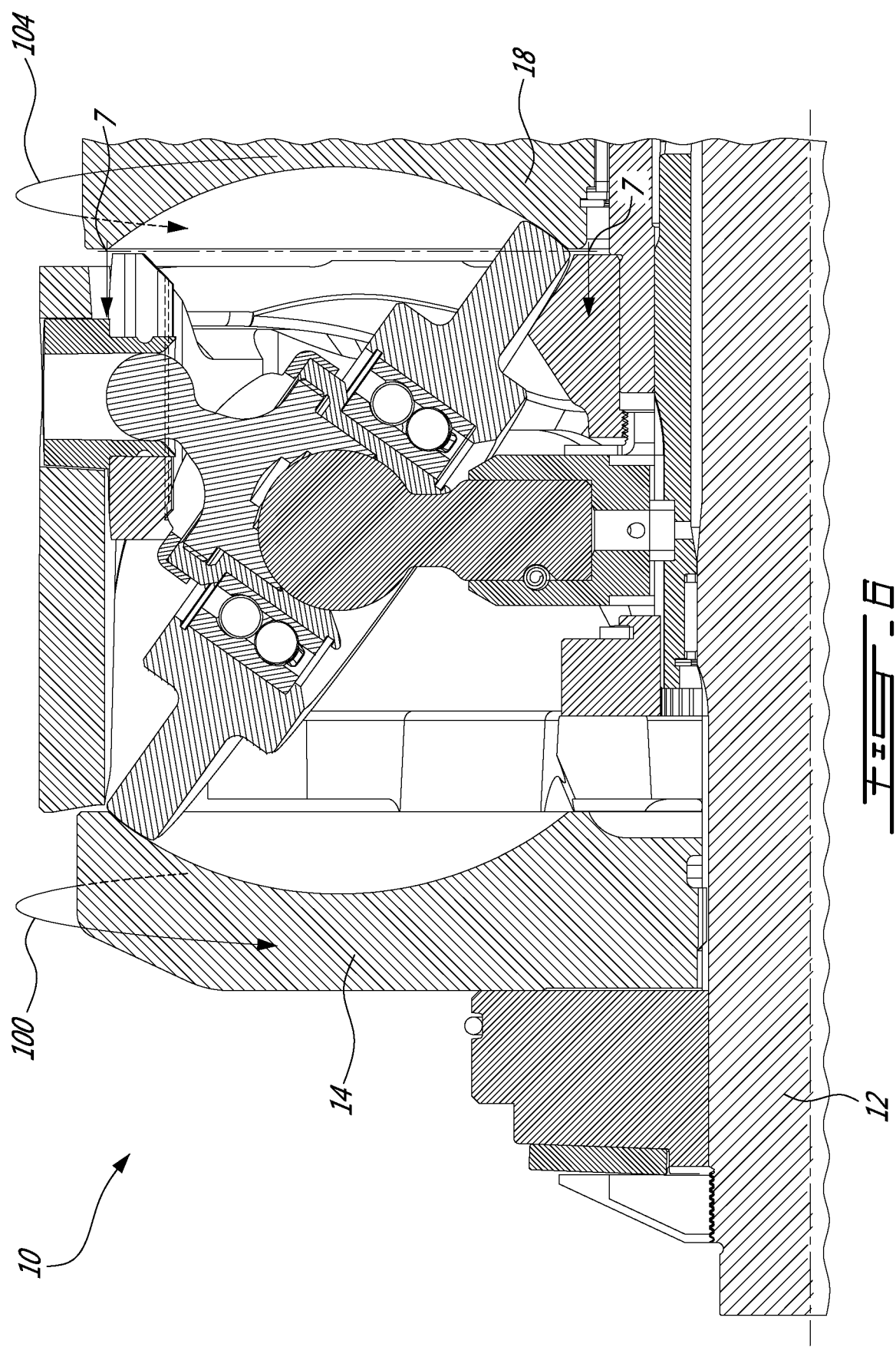
FIG. 6 is a sectional view similar to an enlarged portion of FIG. 2, the CVT being shown in an overdrive position.
Figure 7:
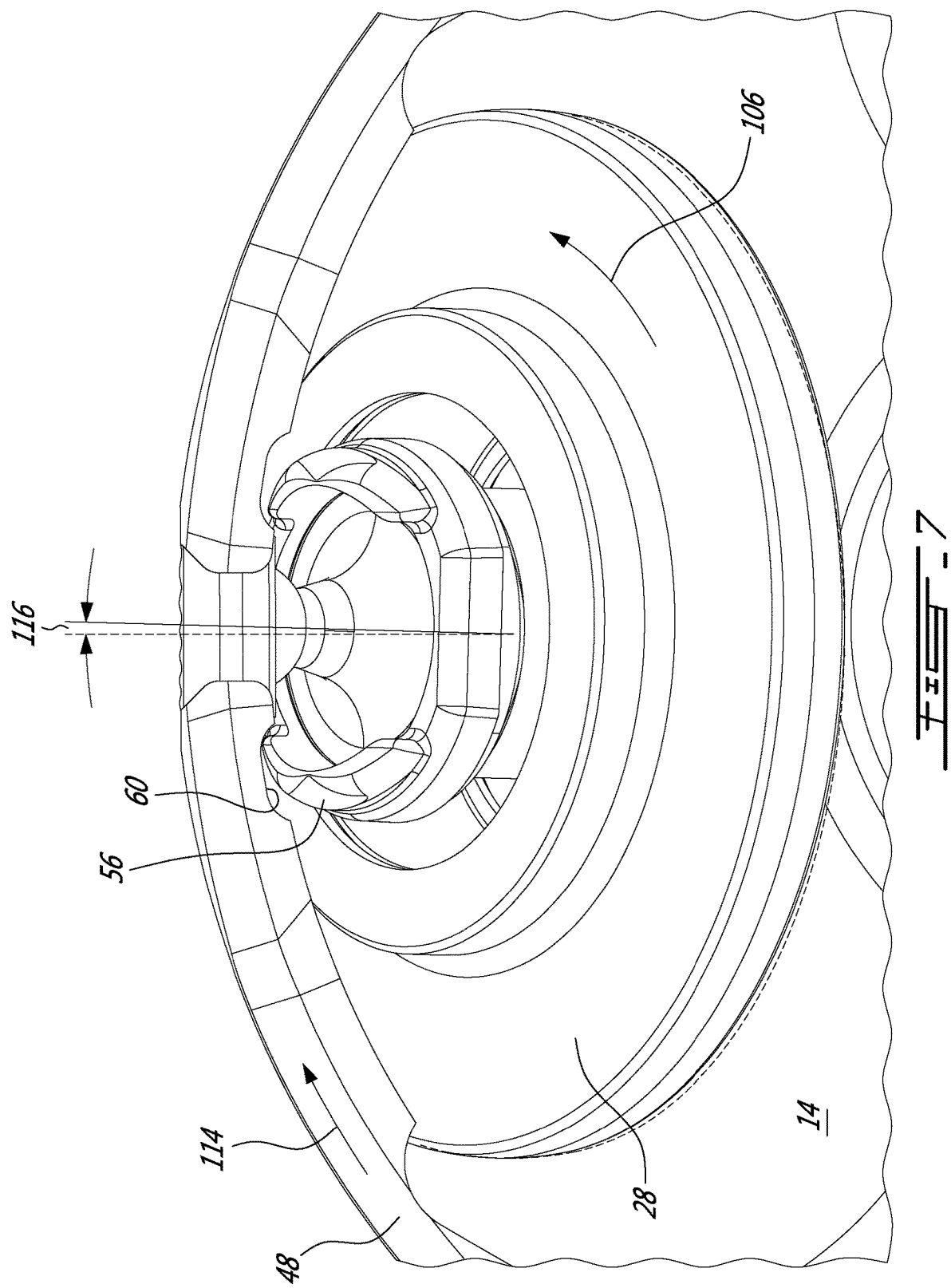
FIG. 7 is a sectional view taken along line 7-7 of FIG. 6.

To go from the unitary position illustrated in FIGS. 4 and 5 towards the overdrive position shown in FIGS. 6 and 7, the inner control ring 48 is again pivoted in the direction shown by arrow 108.

In FIG. 5, the roller 28 is shown in its neutral position in dashed lines and in its maximal skew position, caused by the pivoting action of the inner control ring 48, in full lines. The rotation axis of the roller 28 is also shown in dashed and full lines to illustrate the maximal skew angle 112 of about 2 degrees that is reached when the projection 54 abuts the cutout portion 58.

Turning now to FIGS. 6 and 7, that illustrates the CVT 10 in an overdrive position, i.e. that the rotation speed of the output disk is greater than the rotation speed of the input disk.

To go from the overdrive position illustrated in FIGS. 6 and 7 towards the unitary position shown in FIGS. 4 and 5, the inner control ring 48 is pivoted in the direction shown by arrow 114. It is to be noted that while the direction of arrow 114 appears to be similar to the direction of arrow 108 of FIGS. 3 and 5, it is not since the sectional view of FIG. 7 is taken from right to left in FIG. 6.

In FIG. 7, the roller 28 is shown in its overdrive position in dashed lines and in its maximal skew position, caused by the pivoting action of the inner control ring 48, in full lines. The rotation axis of the roller 28 is also shown in dashed and full lines to illustrate the maximal skew angle 116 of about 2 degrees that is reached when the projection 56 abuts the cutout portion 60.

It is to be noted that even though the maximal skew angle is described herein and illustrated in the appended drawings as being about 2 degrees, other maximal skew angles could be used by changing the shape and size of the projections 54, 56 and/or of the cut-out portions 58 and 60, or by changing the distance between the projections and the cut-out portions.

It is to be noted that while the above illustrated embodiment shows only one roller of a cavity provided with a skew limiter, more than one roller per cavity could be equipped with such a roller for redundancy purposes.

While the above description indicates that the disks 14 and 16 are input disks and that disk 18 is an output disk, the function of these disks could be different, as will be apparent to one skilled in the art.

It is to be understood that the skew limiter for a toric-drive CVT is not limited in its application to the details of construction and parts illustrated in the accompanying drawings and described hereinabove. The skew limiter for a toric-drive CVT is capable of other embodiments and of being practiced in various ways. It is also to be understood that the phraseology or terminology used herein is for the purpose of description and not limitation. Hence, although the skew limiter for a toric-drive CVT has been described hereinabove by way of illustrative embodiments thereof, it can be modified, without departing from the spirit, scope and nature thereof.

What is claimed is:

1. A toric-drive continually variable transmission comprising:
   a longitudinal shaft lying in a longitudinal axis and supporting an input disk thereon and an output disk via a non-rotating sleeve; the input and output disks having facing toroidal surfaces;
   at least two rollers interconnecting the toroidal surfaces of the input and output disks; each of the at least two rollers having an axle provided with a distal end; each at least two rollers being so mounted to the non-rotating sleeve as to be movable along a skew axis and a tilt axis;
   a control ring so mounted to the transmission as to be pivotable about the longitudinal axis, the control ring including apertures each receiving the distal end of the roller axle of one of the at least two rollers; pivotment of the control ring about the longitudinal axis causing a movement of the at least two rollers in the skew axis; and
   a skew limiter provided between the roller axle of one of the at least two rollers and the control ring; the skew limiter including first and second shaped projections so configured as to abut the control ring when a predetermined maximal skew angle of the roller is reached; the skew limiter thereby limiting the skew angle to a known maximal angle notwithstanding the tilt angle of the at least two rollers.

2. A toric-drive continually variable transmission as recited in claim 1, wherein the at least two rollers include three rollers.

3. A toric-drive continually variable transmission as recited in claim 2, including a skew limiter for each at least two rollers.

4. A toric-drive continually variable transmission as recited in claim 2, wherein each at least two rollers are mounted to the non-rotating sleeve via a ball end coupled to the non-rotating sleeve.

5. A toric-drive continually variable transmission as recited in claim 1, including a skew limiter for each at least two rollers.

6. A toric-drive continually variable transmission as recited in claim 5, wherein each at least two rollers are mounted to the non-rotating sleeve via a ball end coupled to the non-rotating sleeve.

7. A toric-drive continually variable transmission as recited in claim 1, wherein each at least two rollers are mounted to the non-rotating sleeve via a ball end coupled to the non-rotating sleeve.

8. A toric-drive continually variable transmission as recited in claim 7, wherein each shaped projections include a semi-circular outer surface configured and sized as to abut the control ring when the maximal skew angle is reached.

9. A toric-drive continually variable transmission as recited in claim 8, wherein each shaped projection have a flat and curved internal surface and an irregularly curved outer surface so configured as to abut the control ring when the skew angle reaches a predetermined maximal value notwithstanding the tilt angle taken by the at least two rollers.

10. A toric-drive continually variable transmission as recited in claim 8, wherein the control ring includes first and second cutouts provided on either sides of the axle receiving aperture to receive the shaped projections.

11. A toric-drive continually variable transmission as recited in claim 8, wherein each shaped projection has a greater radius than a projected radius from a center of the ball end.

12. A toric-drive continually variable transmission as recited in claim 11, wherein the distal end of the roller axle of the at least two rollers define a generally spherical projection that is received in the aperture of the control ring via a socket.

13. A toric-drive continually variable transmission as recited in claim 5, wherein each shaped projection have a flat and curved internal surface and an irregularly curved outer surface so configured as to abut the control ring when the skew angle reaches a predetermined maximal value notwithstanding the tilt angle taken by the at least two rollers.

14. A toric-drive continually variable transmission as recited in claim 1, wherein each shaped projection have a flat and curved internal surface and an irregularly curved outer surface so configured as to abut the control ring when the skew angle reaches a predetermined maximal value notwithstanding the tilt angle taken by the at least two rollers.

15. A toric-drive continually variable transmission as recited in claim 14, wherein the control ring includes first and second cutouts provided on either sides of the axle receiving aperture to receive the shaped projections.

16. A toric-drive continually variable transmission as recited in claim 14, wherein the distal end of the roller axle of the at least two rollers define a generally spherical projection that is received in the aperture of the control ring via a socket.

17. A toric-drive continually variable transmission as recited in claim 1, wherein the control ring includes first and second cutouts provided on either sides of the axle receiving aperture to receive the shaped projections.

18. A toric-drive continually variable transmission as recited in claim 17, wherein the distal end of the roller axle of the at least two rollers define a generally spherical projection that is received in the aperture of the control ring via a socket.

19. A toric-drive continually variable transmission as recited in a claim 1, wherein the distal end of the roller axle of the at least two rollers define a generally spherical projection that is received in the aperture of the control ring via a socket.

20. A toric-drive continually variable transmission as recited in claim 1, wherein tilt axis is also parallel to a roller face of at least one of the two rollers when the at least one roller is in a neutral position and is fixed relative to the non-rotating sleeve.

21. A toric-drive continually variable transmission comprising:
a longitudinal shaft lying in a longitudinal axis and supporting an input disk thereon and an output disk via a non-rotating sleeve; the input and output disks having facing toroidal surfaces;
at least two rollers interconnecting the toroidal surfaces of the input and output disks; each of the at least two rollers having an axle provided with a distal end; each at least two rollers being so mounted to the non-rotating sleeve as to be pivotable about a skew axis and a tilt axis;
wherein, for each roller, the tilt axis is parallel to the planes of the input and output disks and the skew axis is oriented substantially parallel to a diametral axis of the roller;
a control ring so mounted to the transmission as to be pivotable about the longitudinal axis, the control ring including apertures each receiving the distal end of the roller axle of one of the at least two rollers; pivotment of the control ring about the longitudinal axis causing a movement of the at least two rollers about a skew axis; and
a skew limiter provided between the roller axle of one of the at least two rollers and the control ring; the skew limiter including first and second shaped projections so configured as to abut the control ring when a predetermined maximal skew angle of the roller is reached; the skew limiter thereby limiting the skew angle to a known maximal angle notwithstanding the tilt angle of the at least two rollers.

\* \* \* \* \*